United States Patent [19]

Stoltz et al.

[11] Patent Number: 5,570,713
[45] Date of Patent: Nov. 5, 1996

[54] FLOW CONTROL WEIR VALVE

[75] Inventors: Gerhardus J. Stoltz, Pretoria, South Africa; Ronald J. Sargent, Lighthouse Point; Shawn M. McLaughlin, Delray Beach, both of Fla.

[73] Assignee: Baracuda International Corporation, Ft. Lauderdale, Fla.

[21] Appl. No.: 335,083

[22] Filed: Nov. 7, 1994

[51] Int. Cl.⁶ .................................................. G05D 7/01
[52] U.S. Cl. ........................... 137/12; 15/1.7; 137/114; 137/907
[58] Field of Search ............................. 137/111, 114, 137/907, 12; 15/1.7

[56] References Cited

U.S. PATENT DOCUMENTS

| | | | |
|---|---|---|---|
| 218,596 | 8/1879 | Taber | 137/114 X |
| 1,063,030 | 5/1913 | Heidelmann . | |
| 1,200,844 | 10/1916 | Johnson | 251/145 |
| 1,235,800 | 8/1917 | Heller | 251/145 |
| 1,358,673 | 11/1920 | Cooper . | |
| 1,541,540 | 6/1925 | Weir | 137/238 |
| 1,853,863 | 4/1932 | Hornbruch . | |
| 1,908,357 | 5/1933 | Hornbruch | 137/114 |
| 2,111,484 | 3/1938 | Woodson . | |
| 2,252,962 | 8/1941 | Carlson | 137/104 |
| 2,330,151 | 9/1943 | Smith . | |
| 3,181,563 | 5/1965 | Giffen | 137/596 |
| 3,220,710 | 11/1965 | Forster | 261/69 |
| 3,588,036 | 6/1971 | Harter | 251/61 |
| 3,625,221 | 12/1971 | Corbett | 128/276 |
| 3,647,175 | 3/1972 | Bonneau et al. | 251/61 |
| 3,767,055 | 10/1973 | Flatland | 15/1.7 |
| 4,129,904 | 12/1978 | Pansini | 15/1.7 |
| 4,154,679 | 5/1979 | Farage | 210/121 |
| 4,169,484 | 10/1979 | Bonigut et al. | 15/1.7 |
| 4,228,553 | 10/1980 | Genuit | 137/355.27 |
| 4,317,243 | 3/1982 | Chauvier | 137/235 |
| 4,368,751 | 1/1983 | Chauvier | 137/114 X |
| 4,378,254 | 3/1983 | Chauvier | 15/1.7 |
| 4,570,660 | 2/1986 | Chauvier | 137/114 |
| 4,643,217 | 2/1987 | Frentzel | 137/907 X |
| 4,769,867 | 9/1988 | Stoltz | 15/1.7 |
| 4,865,068 | 9/1989 | Mellen | 137/114 |
| 5,033,148 | 7/1991 | Chauvier et al. | 15/1.7 |
| 5,351,709 | 10/1994 | Vos | 137/907 X |
| 5,363,877 | 11/1994 | Frentzel et al. | 137/526 |

FOREIGN PATENT DOCUMENTS

| | | |
|---|---|---|
| 509258 | 7/1939 | United Kingdom . |
| 578354 | 6/1946 | United Kingdom . |
| 657261 | 9/1951 | United Kingdom . |
| 783233 | 9/1957 | United Kingdom . |

*Primary Examiner*—Stephen M. Hepperle
*Attorney, Agent, or Firm*—Dean W. Russell; Mitchell G. Stockwell; Kilpatrick & Cody

[57] ABSTRACT

A flow control weir valve and method of operating the valve is disclosed. The valve has an inlet, an outlet, a bypass inlet, a pivoting cover and a mechanism for controlling the cover in order to provide a relief flow through the valve. The cover is continuously forced to a first, closed position by one or more resilient springs or other flexible force producing mechanisms. When fluid flows within the valve, the closing force generated by the springs may be overcome by the low pressure generated within the valve, which thus allows the ambient environment to force the cover at least partially open once the fluid flow rate passes a threshold value. A step in the body of the valve can be used to interrupt the fluid flow and create a Venturi effect for further assisting the cover to open. The cover is sufficiently responsive to allow a relief flow through the bypass inlet that satisfies rapid and wide-ranging pressure variations created within a cleaning system to which the valve may be attached. Additionally, the valve may be located so that the fluid ingested through the bypass inlet creates a skimming effect that draws debris found on the surface of the liquid in which the valve may be located into the cleaning system through the bypass inlet.

13 Claims, 7 Drawing Sheets

FLOW CONTROL WEIR VALVE

The present invention relates to a valve that both regulates fluid flow through a system subject to variable fluid flow rates, such as a swimming pool cleaning system, and also acts as a skimmer for ingesting debris, such as from the surface of a swimming pool or other body of fluid.

BACKGROUND OF THE INVENTION

Cleaning systems for use in removing debris from bodies of fluid, for instance, swimming pools, often have an automatic cleaner attached through fluid carrying lines to a pump that moves fluid, in which debris is entrained, through the lines to a filtering system. Fluids pumped through such systems often exhibit variations in flow that cause spikes or pulses that may travel through and disrupt the system. It is desirable to prevent such spikes and even when their prevention is impossible, it may be necessary to mitigate their effects, which range from destroying fluid carrying lines to placing sharply variable loads upon the automatic cleaners, lines, valves or pump that together move fluid through the system. Such variable loads may decrease drastically the life of the components of the cleaning system.

One method of avoiding or mitigating the effects of pressure variations is to provide a control valve having an auxiliary path through which fluid can flow in order to balance the system. U.S. Pat. No. 1,853,863 to Hornbruch discloses a control valve for gas burners. Hornbruch teaches a valve that uses a bias means or spring to hold a piston in a position that closes a bypass inlet, which is connected to a mixing chamber, to the passage of gas. A pressure chamber underneath one end of the piston is connected via a duct to a tube through which air flows into the mixing chamber. When the pressure within the chamber overcomes the bias of the spring, the piston, which has a reduced in size portion, will move to allow gas to flow through the reduced portion and into the mixing chamber. The bias means can be set to require an initially higher or lower chamber pressure to move the piston. While suitable for use with gaseous materials, the Hornbruch valve is not useable with fluids in which debris is entrained. Such debris would quickly become trapped in the reduced portion of the piston and block the opening. Additionally, the Hornbruch valve is not responsive to sharp and rapid pressure variations. In fact, Hornbruch teaches that a piston should be used "inasmuch as the friction between it and the walls prevent rapid fluctuation or fluttering of the combustible gas control valve."

However, rapid pressure variations, such as a spike or "water hammer," occur frequently in swimming pool cleaning systems since debris may be ingested by the cleaning system and block certain portions of the system to thereby cause an undesired and disruptive pressure spike. This danger is particularly enhanced when it is desirable to provide a skimming action that ingests debris that floats on the top surface of the fluid. Debris such as leaves often has a large surface area and may therefore more readily block fluid lines, possibly preventing the cleaning system from continuing cleaning operations. Of course, this problem can be mitigated by providing a self-contained skimmer, such as the one disclosed by U.S. Pat. No. 3,767,055 to Flatland, entitled "Skimmer for a Water Body." The disclosed skimmer is propelled about a swimming pool and has a float that positions the skimmer upon the surface of the pool. An opening located opposite the propeller leads to a filter basket in which debris is trapped after it enters the opening. The skimmer may also be driven by an outlet pipe that provides a jet of water supplied by a hose leading to the pool filter return. If, however, automatic cleaning of the total swimming pool is desired, the disclosed skimmer cannot accomplish both its skimming function and cleaning of the pool bottom.

A series of U.S. Pat. Nos. 4,317,243, 4,368,751 and 4,378,254 to Chauvier each disclose "a valve by means of which a major portion of the suction flow of a swimming pool filtration system is channeled through an automatic cleaning device which cleans the floor and/or wall of a swimming pool, and a minor portion of the suction flow is drawn from the surface of the pool thereby to skim the surface." The valve assembly, which is connected between an automatic pool cleaner and a suction pump, has an auxiliary inlet adjacent the pool surface and a closure member that is capable of opening and closing the auxiliary inlet. A bellows assembly and spring engaging the closure member effectively "pre-loads" it, thereby resisting movement of the closure member that would otherwise open the auxiliary inlet. Lowering the internal pressure of the valve causes the spring to compress, moving a frame that in turn forces, or "induces," the flap to open. This inducement is accomplished by the bellows assembly, which communicates with the interior of the valve and is mechanically connected to the spring.

Under normal operating conditions, the closure member eventually reaches an equilibrium, "intermediate" position in which the auxiliary inlet is partially open. If leaves, papers, or other surface debris block the partially-open auxiliary inlet, the resulting pressure differential will displace the bellows assembly, "compressing the spring . . . and decreasing the force by means of which the flap . . . is held in its" initial, closed "position. As a result, the flap . . . will open, allowing water to be sucked into the housing . . . through the" auxiliary inlet and drawing away the debris. Such bias towards the open position when detritus blocks the auxiliary opening occurs as a result of a decrease of pressure in the chamber formed by the bellows assembly that compresses the spring and biases the closure member toward the full open position. In order to move the flap to the full open position, the spring must be compressed through a significant distance. Thus, without the bellows assembly compressing the spring in response to decreased fluid flow through the valve, the closure member cannot open to ingest the debris and the auxiliary inlet will therefore be blocked.

Chauvier accordingly teaches that decreasing the bias force holding the closure member closed is essential to operation of the valve. Moreover, in the Chauvier valve, variation in the bias force that forces the flap closed must track directly the varying fluid flow through the auxiliary inlet; as fluid flow through the auxiliary inlet increases, bias force increases and the closure member closes, and, as fluid flow through the auxiliary inlet decreases, bias force decreases and the closure member opens. This variation in bias force in response to blockage of the auxiliary inlet is critical because, according to Chauvier, there are "systems in which an aperture in a cover is closed by means of a disc, the disc being biased against the cover by means of a spring. With such systems, the biasing force is independent of the amount of water flowing through the aperture and, in use, the restricted passage provided between the cover and the disc becomes blocked with leaves and the like."

In the Chauvier valve, "the main flow of water will be through the cleaning device, with a lesser amount of water flowing through the restricted aperture of the auxiliary opening." Accordingly, a major disadvantage of using the Chauvier valve, with its almost exclusive focus on skimming the surface of the water, is that it may not provide a sufficient fluid flow through the auxiliary inlet to the cleaning system to balance large pressure variations while maintaining a nearly constant flow through the automatic swimming pool cleaner. Nor can the Chauvier valve operate with the various automatic swimming pool cleaners that may each operate at a different optimal flow rate. For instance, in one system it may be desirable to provide a 14 gallons per minute (gpm) fairly constant fluid flow rate to the cleaner. For other systems, a relatively higher constant fluid flow rate may be necessary. It is therefore often necessary to adjust the threshold at which the auxiliary path in a valve opens in order to allow use of the valve with various systems. However, the only way in which the Chauvier valve could be so adjusted would be to replace completely the bellows assembly or disassemble the bellows assembly in order to exchange the spring within the bellows assembly for a stronger or weaker spring. Such a process is at the least time consuming and difficult.

Notwithstanding Chauvier's teaching to the contrary, it is possible and desirable to provide a flow control valve that skims the surface of the body of fluid in which it operates and covers a bypass inlet in such a way that the opening and closing of the cover is independent of the amount of water flowing through the bypass inlet and may be accomplished without the complex, unwieldy bellows assembly structure that is central to the Chauvier valve. Instead, it is desirable for the flow control valve to be responsive to the rapid pressure changes within the system rather than merely blockage of the skimmer aperture, and for the valve to be capable of ingesting large amounts of bypass fluid through a bypass inlet to compensate for large pressure variations within a variety of automatic cleaning systems.

SUMMARY OF THE INVENTION

The present invention provides a valve having a cover or flap fitted over a bypass inlet, with the cover forming one arm of a structure similar to a bell crank. A pair of tension springs attached to the other arm of the bell crank and an anchor located on the valve body exert a force that holds the cover in the closed position when no fluid flows through the main body of the valve. As fluid flows through the valve body in response to suction generated by a pump communicating with the valve, the flow generates lower pressure within the valve body. When the flow velocity exceeds a threshold value (which depends on various factors including the force exerted by the tension springs, the shape of the cover and the depth at which the cover is located within the container of fluid), the ambient pressure exerted on the top surface of the cover overcomes the force exerted by the tension springs and the fluid flow impacting the bottom surface of the cover that together normally hold the cover in the closed position. A step may be located within the valve body and in the fluid flow path to cause a constriction in the fluid flow that creates a Venturi effect. The Venturi effect operates to reduce further the pressure within the valve body so that the ambient pressure on the outside of the cover may more easily overcome the retarding forces and open the cover.

The springs continually restrict the motion of the cover. In fact, as the cover opens to allow bypass fluid flow into the valve body, the length of the springs increases and, correspondingly, the total retarding force that compels the cover to its closed position also increases. Accordingly, the cover moves from a closed to an open position solely through ambient pressure acting on the surface of the cover to overcome continuous retarding forces that actually increase as the cover opens. The retarding force increase is at least partially offset by an additional opening force that occurs as the auxiliary fluid, which generates a force on the top surface of the cover, begins flowing.

Eventually, however, the cover may reach a partially open equilibrium position, assuming the pump generates a constant suction. Otherwise, the cover will fluctuate to allow greater or smaller rates of fluid flow through the bypass inlet depending upon the pressure variations within the cleaning system to which the valve may be connected. The bypass inlet is capable of ingesting a major and sharply fluctuating portion of the fluid needed to balance the pressure within the system, while a minor, but relatively constant portion flows through the main valve body. This allows the valve to compensate for larger spikes or pulses within the system, while providing a relatively constant fluid flow to a cleaning device communicating with the valve. One such cleaning device with which the present invention works particularly well is that disclosed in U.S. Pat. No. 4,769,867 to Stoltz, which patent is incorporated herein in its entirety by this reference.

Variations in the fluid flow rate may be caused by numerous factors. For instance, the filter system through which the fluid passes may become so loaded with debris as to increase the resistance within the system and thus cause the fluid flow to be reduced. If the filters are cleaned and replaced, the decreased resistance will result in faster flow rates for the same pump suction. Alternatively, the pump may create a "pulse" that results in significantly increased flow rate for short periods of time. Regardless of the cause of the pressure variations, the flow control valve of the present invention stabilizes the system by allowing an auxiliary fluid flow to enter the system and accurately compensate for fluid flow rate variations. When the pressure within the system decreases, more fluid enters the bypass inlet; when the pressure within the system increases, less fluid enters the bypass inlet. Because the cover is automatically responsive to the fluid flow rate variations, only fluid flow through the bypass inlet changes dramatically; the fluid flow through the automatic swimming pool cleaner remains relatively constant.

In fact, the valve of the present invention is capable of ingesting such large amounts of fluid through the bypass inlet that it may be necessary to position the valve farther from the surface of the swimming pool or other body of fluid in which it is located than is typical for other systems that skim the pool surface. It may also be necessary to position the valve so that the bypass inlet faces away from the surface of the fluid. Otherwise, the large volume of fluid entering the bypass inlet is likely to form a vortex and suck air into the system, which would cause the source pump to either cavitate or lose its prime. Alternatively, the present invention can be equipped with a vortex inhibitor to discourage vortex formation.

Notwithstanding its location or the optional vortex inhibitor that the valve may be equipped with, the valve remains capable of acting as a weir in order to skim the surface of the pool in which it may be located and remove surface debris. If the bypass inlet is blocked by debris, fluid flow through the main body of the valve increases, further lowering the pressure within the valve, with the result that the ambient pressure on the opposite side of the cover is opposed by less force and is sufficient to cause the cover to open further, thereby allowing the bypass inlet to ingest whatever debris is present at the bypass inlet. Additionally, as it opens farther, the cover allows more fluid to enter the bypass inlet to compensate for the pressure decrease within the system initially caused by the blocking of the bypass inlet by the debris.

Providing an offset to the force holding the cover closed may be necessary when the valve may be used in different systems having different base flow rates. As an illustrative example, consider a first system in which a 14 gpm flow rate through the cleaner is desired and a second system in which a 20 gpm flow rate through the cleaner is desired. In the first system, 14 gpm is the threshold value above which the cover should open to allow an auxiliary flow. That is, when the source exerts force on the fluid that would lead to a higher flow rate than 14 gpm, it is desirable that the cover open to ingest sufficient fluid to balance the system while still allowing a relatively consistent 14 gpm fluid flow through the main portion of the valve. When the source is not sufficiently strong to generate a 14 gpm fluid flow, it is desirable that the cover stay closed in order to give the cleaner the maximum amount of fluid flow. Similarly, in the second system the threshold value above which the cover should open and below which the cover should stay closed is 20 gpm.

The present invention allows the same valve to be used for both the first and second systems despite the different threshold values of those systems by offering an adjustment mechanism for initially offsetting the amount of tension provided by the springs so that the valve operates within a pressure variation range suitable for a particular cleaning system. Each of the dual tension springs are attached to the arm of the pivoting cover and an adjustable panel or anchor, which may move about and be fixed to a support extending from the valve body. The amount of closing force provided by the springs may be set by moving the anchor either closer to or farther away from the arm of the skimmer cover. As the anchor is moved farther away from the arm, the length of, and proportionally the amount of closing force exerted by, the dual springs increase. Conversely, moving the anchor closer to the arm decreases the length of the springs and therefore the closing force they exert. When the closing force is greater (i.e. when the dual tension springs are at their longest length), there will be more fluid flow through the main inlet and less flow through the bypass inlet. Conversely, when the springs are set at their lowest tension, there will be more flow through the bypass inlet than through the main inlet. In addition, higher or lower tension springs can be provided when suitable. Once, however, the correct setting for the anchor has been chosen, so that the valve operates at the correct threshold and within the flow range suitable for the particular cleaner and pump, no further adjustment is required.

Construction of the valve may be accomplished by forming the valve in one unitary body from a material such as an acetal coploymer. Other materials, including plastics such as polyvinyl chloride or polypropylene, metals or ceramics may also be appropriate. Alternatively, the valve may be formed in sections and the sections may then be attached to form a unitary body. Such a modular manufacturing approach significantly simplifies the process since the complex shape of the valve may be more readily formed in separate molds and then assembled. Prongs on one section may be provided for snap fitting into matching apertures located upon the other section. Additionally, a rim on the mating face of one section may engage a groove surrounding a corresponding area on the mating face of the other section, or posts may insert into matching recesses to provide a tight fit. Although adhesive or another fastening system may also be used, the snap fitting prongs are, alone or combined with the posts, sufficient for a tight fit. Mechanically coupling the two (or more) main sections together allows the device to be readily disassembled for cleaning in the event that debris becomes lodged within the valve.

In short, the present invention can be tuned for use with various cleaning systems in order to stabilize pressure variations within particular cleaning systems by providing bypass fluid flow. The valve is also adaptable for virtually any other application requiring a stable and accurate primary flow. While providing such a bypass flow, the valve may skim the surface of the fluid in which it is located and may optionally be equipped to minimize vortex formation. Furthermore, the components of the present invention are selected from material that will provide long life, reliable performance, low cost, easy manufacture or assembly and aesthetic appearance.

It is therefore an object of the present invention to provide a flow control valve.

It is another object of the present invention to provide a flow control valve capable of compensating for a wide range of variations in fluid flow rates within a cleaning system.

It is another object of the present invention to provide a flow control valve capable of being adjusted to accommodate a variety of cleaning systems, each of which may have a different threshold and operating range.

It is an additional object of the present invention to provide a flow control valve with a region in which low pressure is generated so that the flow control valve can achieve more stability and accuracy in responding to fluid flow rate variations within a cleaning system.

It is yet a further object of the present invention to provide a flow control valve capable of skimming the top surface of a body of fluid in order to ingest any debris located upon the top surface.

It is yet another object of the present invention to provide a flow control valve designed from components that are of long life, low cost, and that can be easily manufactured and present an aesthetic appearance.

Other objects, features and advantages of the present invention will become apparent with reference to the remainder of the text and the drawings of this document.

DETAILED DESCRIPTION OF THE DRAWINGS

Figures 1, 2:
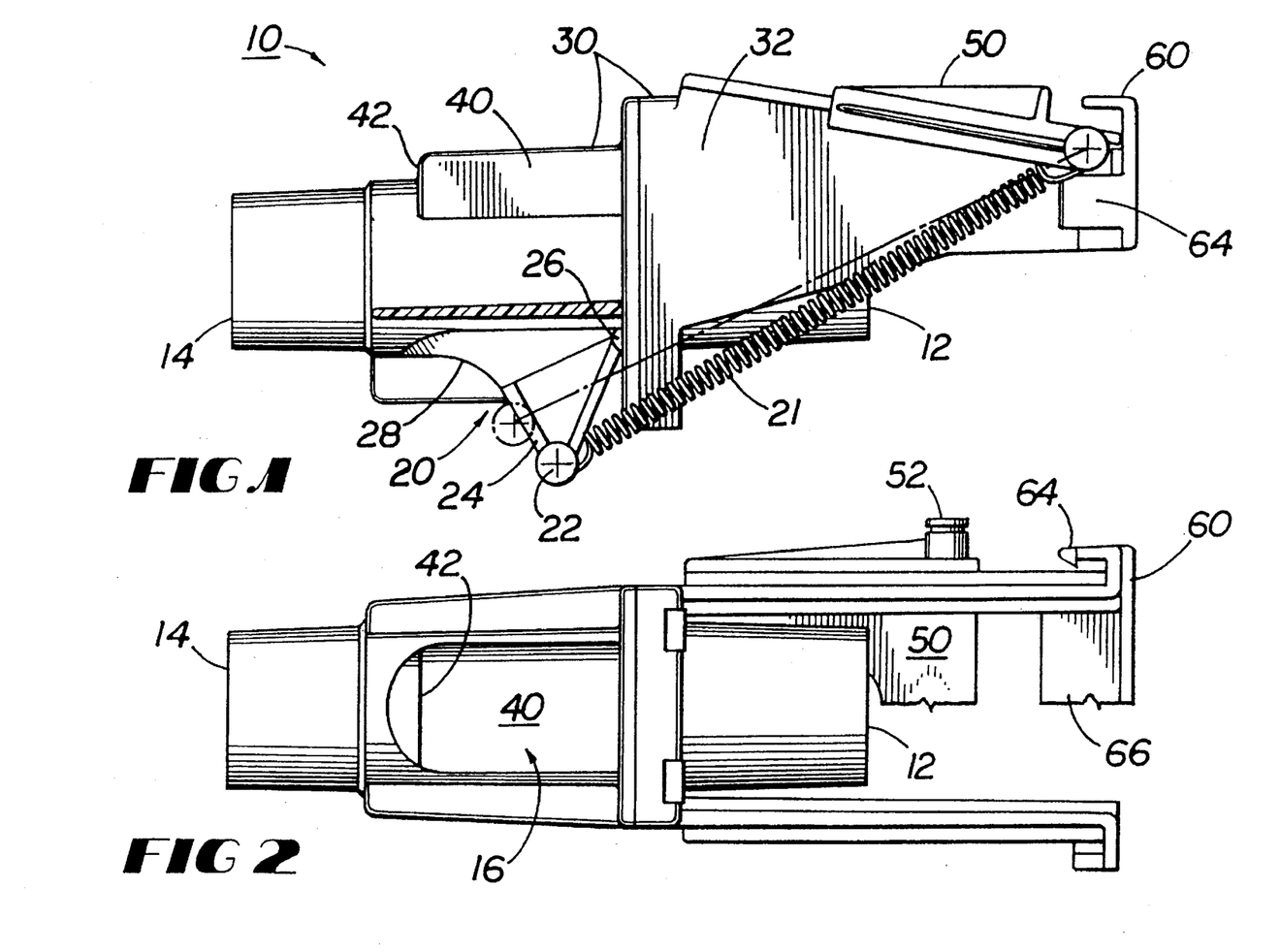
FIG. 1 is a side view of the flow control valve of the present invention.
FIG. 2 is a top, partially cut-away view of the valve shown in FIG. 1 with the flap and spring removed.

As shown in FIGS. 1 and 2, a valve 10 has a generally tubular inlet 12 and outlet 14 and a bypass inlet 16. A flexible hose or other fluid carrying line may connect the inlet 12 to an automatic cleaner or other device located within a container filled with a fluid, such as a swimming pool. On the other end of the valve 10, the outlet 14 may be connected to a filtration system via another flexible hose or other means for carrying a fluid. The fluid transported through the flexible hose may pass through the filtration system so that any debris entrained in the fluid is removed. Alternatively, an elbow or other suitable pipe may connect the outlet 14 directly with a filtration system. A pump communicates with the fluid line or filtration system in order to cause fluid to flow through the automatic swimming pool cleaner and the valve 10 via the main inlet 12 or the bypass inlet 16 and through the outlet 14. Flap 20 is continuously biased toward its closed position, as shown in FIG. 1, and substantially blocks fluid from entering the bypass inlet 16 while in the closed position.

A step or cavity 40 may be situated beneath the bypass inlet 16 so that a main body 30 of the valve 10 is widened at inlet 12 and then restricted near outlet 14. A first wall 42 joins the cavity 40 to the outlet 14 end of the valve 10. A second wall 43 (FIG. 3) joins the recessed cavity 40 to the inlet 12 end of the body 30. Sides and a bottom 44 join the first and second walls 42, 43 to complete the cavity 40, which appears to be a rectangular, pan-like structure suspended from the bottom of the body 30. Other shapes for the cavity 40 may be used or simple obstructions placed within the body 30 in order to give the valve 10 a geometry that creates a Venturi effect. Alternatively, the cavity 40 may be omitted from the body 30.

Figure 3:
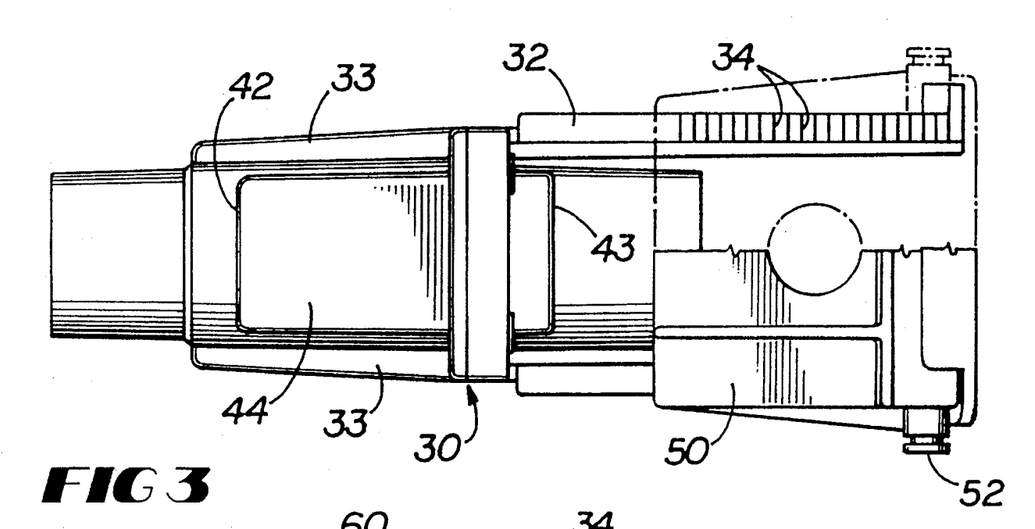
FIG. 3 is a bottom, partially cut-away view of the valve of the present invention.
Figure 4:
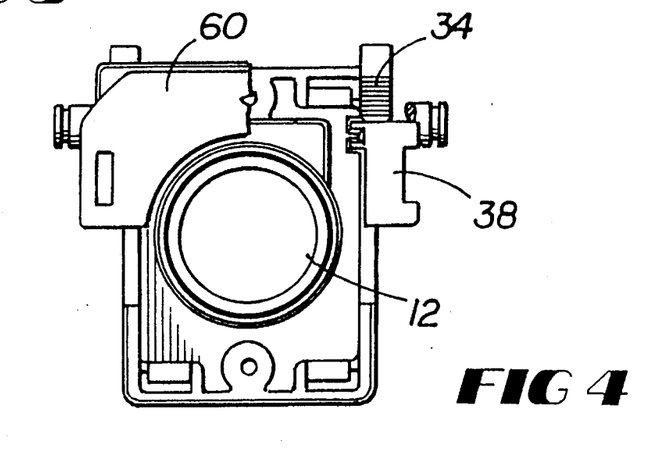
FIG. 4 is a rear, partially cut-away view of the valve shown in FIG. 3.
Figure 5A:
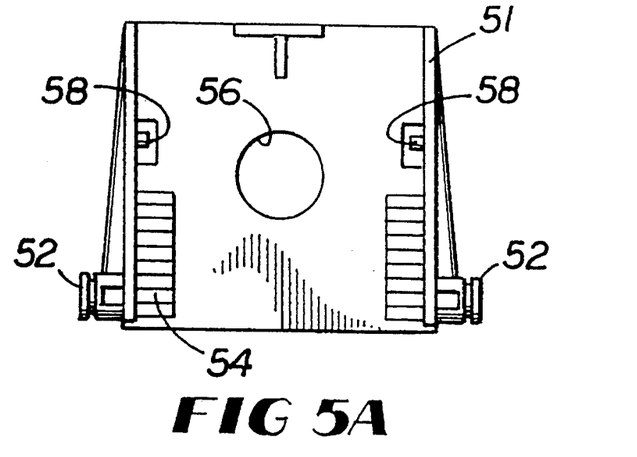
FIGS. 5A–B are bottom and front views, respectively, of the anchor used with the valve of the present invention.
Figure 5B:
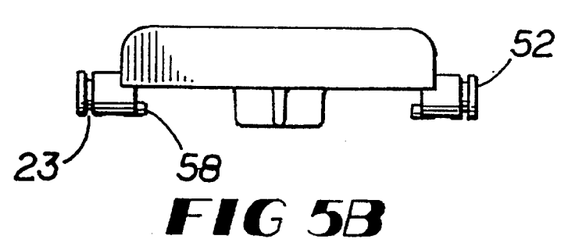

Body 30 has sides 32 to which an anchor 50 and an end cap 60 may be attached as illustrated in FIGS. 3 and 4. Sides 32 are inscribed with ridges 34 that interlock with a corresponding series of anchor ridges 54 (FIG. 5A) formed in each border 51 of the anchor 50, which may generally form a panel-like structure. Although sides 32 extend outwardly from the body 30 and are substantially parallel with one another, the particular orientation of the sides 32 relative to the body 30 is unimportant. FIGS. 5A–B show projections 58 that extend from each border 51 of the anchor 50 and that may engage the sides 32 in order to prevent the anchor 50 from simply falling off of the body 30. A spring 21 is normally stretched between an end of the arm 22 of the flap 20 and a knob 52 located on one border 51 of the anchor 50. Spring 21 may have a loop on one end that inserts into a circular indentation 23 inscribed about the knob 52 and arm 22. A second spring 21 may be similarly secured between the other end of arm 22 and a second knob 52. Arm 22 may be supported by gussets 24 that merge into a face surface 28 of the flap 20. Angling the face surface 28 assists fluid in flowing into the bypass inlet 16 when the flap 20 is pivoted open.

When attached, the springs 21 will pull the anchor 50 tightly against the sides 32 of the body 30 and thereby engage the anchor ridges 54 with the ridges 34 on the body 30. When it is desired to exert less force on the flap 20, only a single spring 21 or weaker spring(s) 21 could be attached to the flap 20 and the anchor 50. Optionally, the sides 32 are angled so that moving the anchor 50 along the sides 32 changes the angular orientation of the springs 21 with respect to the pivot point 26 to thereby change the amount of retarding force holding the flap 20 in its closed position. Alternatively, the springs 21 could be connected to a fixed point upon the body 30 of the valve 10. Other devices such as a flexible belt or membrane may be used to force the flap 20 toward its closed position. However, dual tension springs 21 are an appropriate choice for continuously forcing the flap 20 towards its closed position since the tension springs 21 are resilient and long lasting despite the environment (e.g. heavily chlorinated swimming pool water) in which the springs 21 may operate.

Ridges 34 on the sides 32 will interlock with the anchor ridges 54 and prevent the anchor 50 from sliding forward under the influence of the forces exerted by the springs 21 attached to each end of the arm 22 and knobs 52. Anchor 50 is provided with an aperture 56 through which a user may insert a finger or screwdriver in order to lift the anchor 50 and disengage the ridges 34, 54 in order to traverse the anchor 50 along the supporting sides 32. Moving the anchor 50 toward the flap 20 decreases the force exerted by the springs 21; moving the anchor 50 away from the flap 20 increases the force exerted by the springs 21. Projections 58 will prevent the user from inadvertently lifting the anchor 50 entirely away from the sides 32 of the body 30. Instead, however, of a movable anchor 50 providing the adjustment mechanism for changing the amount of closing force provided by the springs 21, the springs 21 could be attached to a sliding block located within a slot on a support attached to the body 30. An adjustment screw could then be turned to bear down against the slot in order to set the block at a particular point and provide a desired degree of tension in the springs 21. Other means for adjusting the retarding force applied to the flap are also available.

Figure 6A:
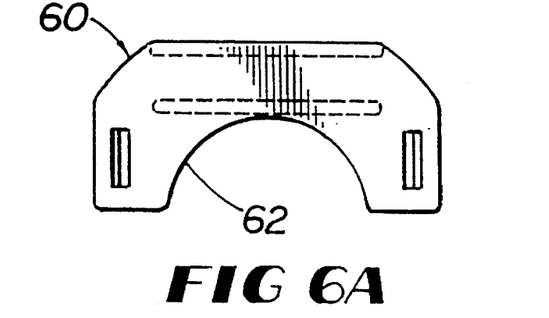
FIGS. 6A–B are top and side views, respectively, of the end cap as used with the valve of the present invention.
Figure 6B:
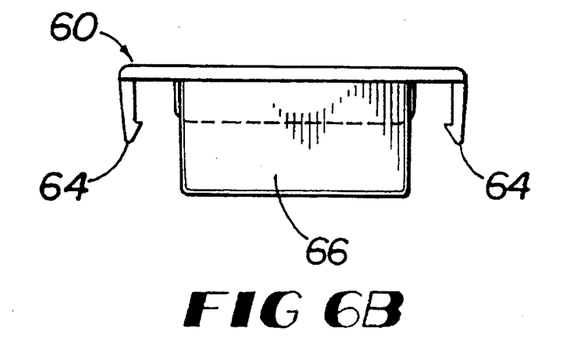

End cap 60, shown in FIGS. 6A–B, can be attached to the sides 32 to prevent the anchor 50 from being pulled completely off the body 30 or from inadvertently sliding off the body 30 in the event that the springs 21 are not attached to the anchor 50 and flap 20. Additionally, the end cap 60 interlocks the sides 32 together to provide a more rigid support for the anchor 50. Thus, end cap 60 is attached to the sides 32 via engaging prongs 64 that have angled faces for first sliding over corresponding capture faces 38 located on the sides 32 of the body 30 and then interlocking with the capture faces 38. A ledge 66 formed on the end cap 60 may insert into tracks or slots located on the sides 32 of the body 30 in order to pull the sides 32 against the ends of the ledge 66 and thus provide additional structural support. Finally, the end cap 60 has a semi-circular cutout 62 against which a hose or line can bear once it is attached to the inlet 12. Allowing the hose to bear against the semi-circular cutout 62 decreases the likelihood that the hose will pull away from the friction or other fit with which it is attached to the inlet 12.

Figure 7:
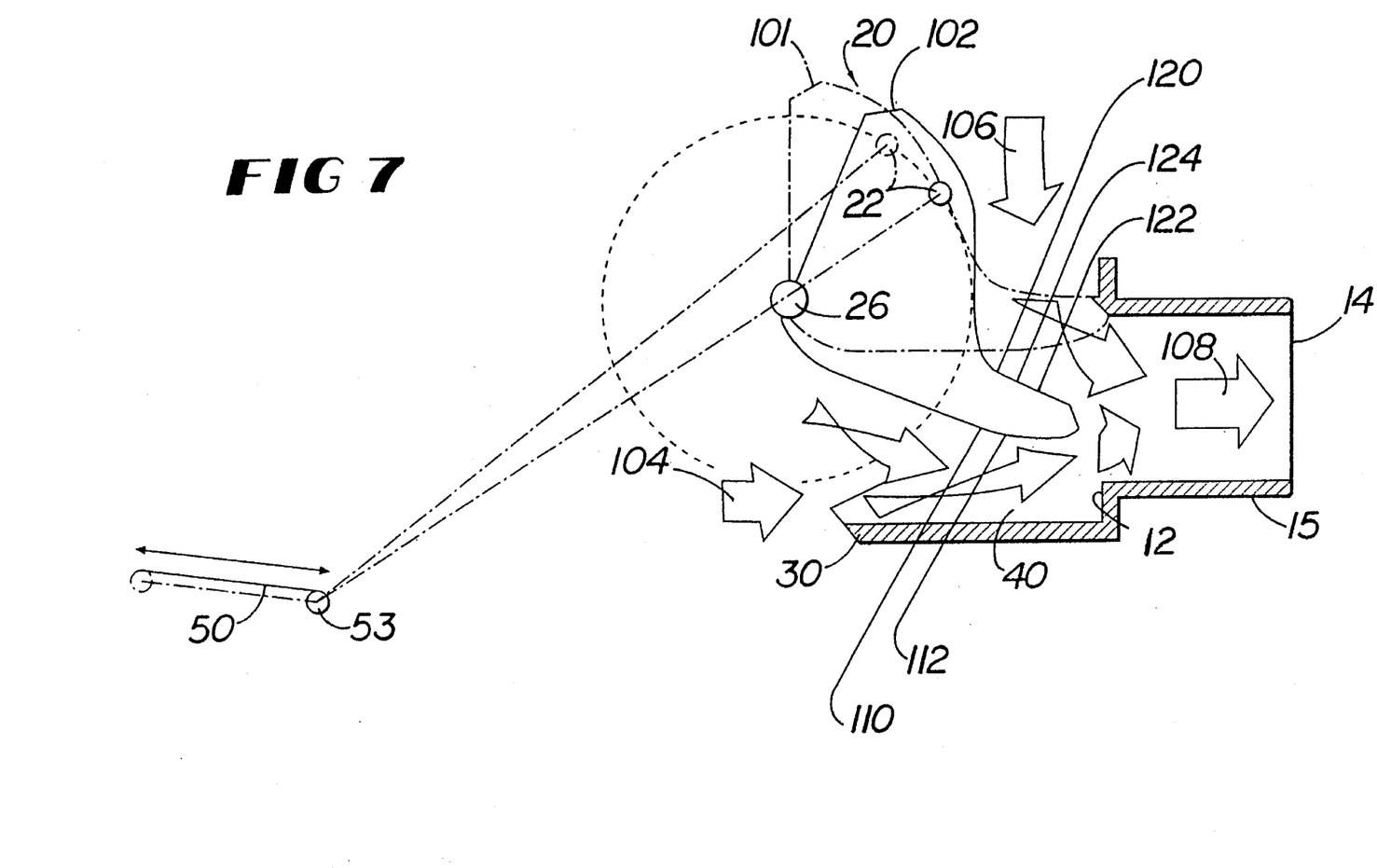
FIG. 7 is a schematic view showing the forces that dynamically control the cover of the valve of the present invention.

FIG. 7 is a schematic diagram of the dynamic forces operating on the flap 20. Flap 20 rotates about the pivot point 26 from a first position 101 to a second position 102, although the flap 20 could rotate past the second position 102 so that the tip of the flap 20 aligns with a bottom 15 of the outlet 14. Normally, a spring 21 is attached to create tension between knob 52 and the arm 22 so that the flap 20 is forced toward the first position 101, in which position the flap 20 is closed and blocks substantially all fluid attempting to enter the bypass inlet 16. The magnitude of force holding the flap 20 in the first position 101 can be changed by moving the anchor 50 closer or farther away from the arm 22 (which changes the length of the spring 21 and the angle of the axis of spring 21 relative to the flap 20).

As the flap 20 moves from the first position 101 to the second position 102, it displaces through a significant distance, yet the spring 21 undergoes only a small displacement because it is positioned at approximately between a 30° to 45° angle (depending on where the anchor 50 is positioned) relative to a horizontal axis passing through the pivot point 26. Of course, the less the distance spring 21 needs to extend, the less force needed to displace it. Thus, the flap 20 will be more sensitive to the changes in pressure within the valve 10 since small pressure variations may exert sufficient opening force on the flap 20 to displace the spring 21 the small amount needed to move the flap 20 to a more or fully open position. Accordingly, changing the positioning of the spring 21 with reference to the pivot point 26 may increase or decrease the sensitivity of the flap 20 to system pressure variations depending on whether the spring 21 is required to undergo more or less displacement in order to open the flap 20.

Generally, FIG. 7 shows two types of forces acting upon the flap 20—"closing" forces and "opening" forces. The closing forces acting upon the flap 20 are (1) the (initially adjustable) tension spring force 110, and (2) the line fluid force 112 generated as a relatively constant cleaner flow 104 moves through the body 30 and pushes against the bottom surface of the flap 20. Opening forces oppose or, under the right conditions overcome, these closing forces. One opening force is the line vacuum force 120 generated by the low pressure within the fluid carrying line, which low pressure tends to pull the flap 20 towards second position 102. Second, a Venturi effect force 122 may be created by the region of low pressure generated within the cavity 40 by the cleaner flow 104 impacting upon the wall 42. The Venturi effect 122 also tends to pull the flap 20 from its first position 101 to its second position 102. The magnitude of the line vacuum and Venturi effect forces 120, 122 is directly proportional to the rate at which total fluid flow 108 moves through the body 30. Additionally, the magnitude of the Venturi effect 122 is influenced by the speed of fluid flowing through the body 30, which is a function both of the total fluid flow 108 rate and the size of the passage through the body 30 (which size is determined in part by the geometry of the body 30, the presence within the body 30 of the optional cavity 40 or the position of the flap 20, which as it opens tends to constrict the body 30). Finally, the ambient pressure also exerts an opening force upon the face 28 of the flap 20.

As the cleaner flow 104 rushes through the valve 10 from the inlet 12 to the outlet 14, it will impact the wall 42 and create the region of low pressure about the recessed cavity 40. This low pressure region creates the Venturi effect 122 that opposes the spring and line closing forces 110, 112. When the total fluid flow 108 reaches a critical velocity, the resulting lower pressure (caused both by the line vacuum and Venturi effect forces 120, 122) within the body 30 of the valve 10 allows the ambient pressure exerted upon the face 28 of the flap 20 to pivot the flap 20 open in order to allow fluid to flow through the bypass inlet 16. Once open, the variable flow 106 through the bypass inlet 16 generates an incoming fluid flow force 124 upon the flap 20. This incoming flow force 124 assists in overcoming the increased resistance offered by the springs 21 when the flap 20 moves to an open position. These dynamic forces that act upon the flap 20 are such that even when the flap 20 is in its second, open position 102, the cleaner flow 104 remains relatively constant while the variable flow 106 from the surrounding environment through the bypass inlet 16 fluctuates in order to balance variations in system pressure.

In the event that the system pump increases the suction upon the line, the flap 20 can open farther to allow a larger bypass variable flow 106 through the bypass inlet 16. Because of the larger amount of bypass fluid entering the valve 10 through the bypass inlet 16, the cleaner flow 104 rate between the automatic pool cleaner and the inlet 12 can be maintained at a substantially constant rate despite the increased demand. Any additional demands for a higher total fluid flow 108 put upon the system by the increased suction offered by the pump or the removal of resistance within a system having a constant level of pump output (such as cleaning loaded filters) will result in an increased variable flow 106 through the bypass inlet 16 and generally change very little the cleaner flow 104 coming from the automatic swimming pool cleaner. Likewise, if the pump decreases the amount of suction that it exerts upon the system, the flap 20 can easily swing from its partially open second position 102 to a less open position or even the closed first position 101 in order to decrease or eliminate the bypass variable flow 106 through the bypass inlet 16 while maintaining both a relatively constant cleaner flow 104 and a total flow 108 that balances the system.

Figure 10:
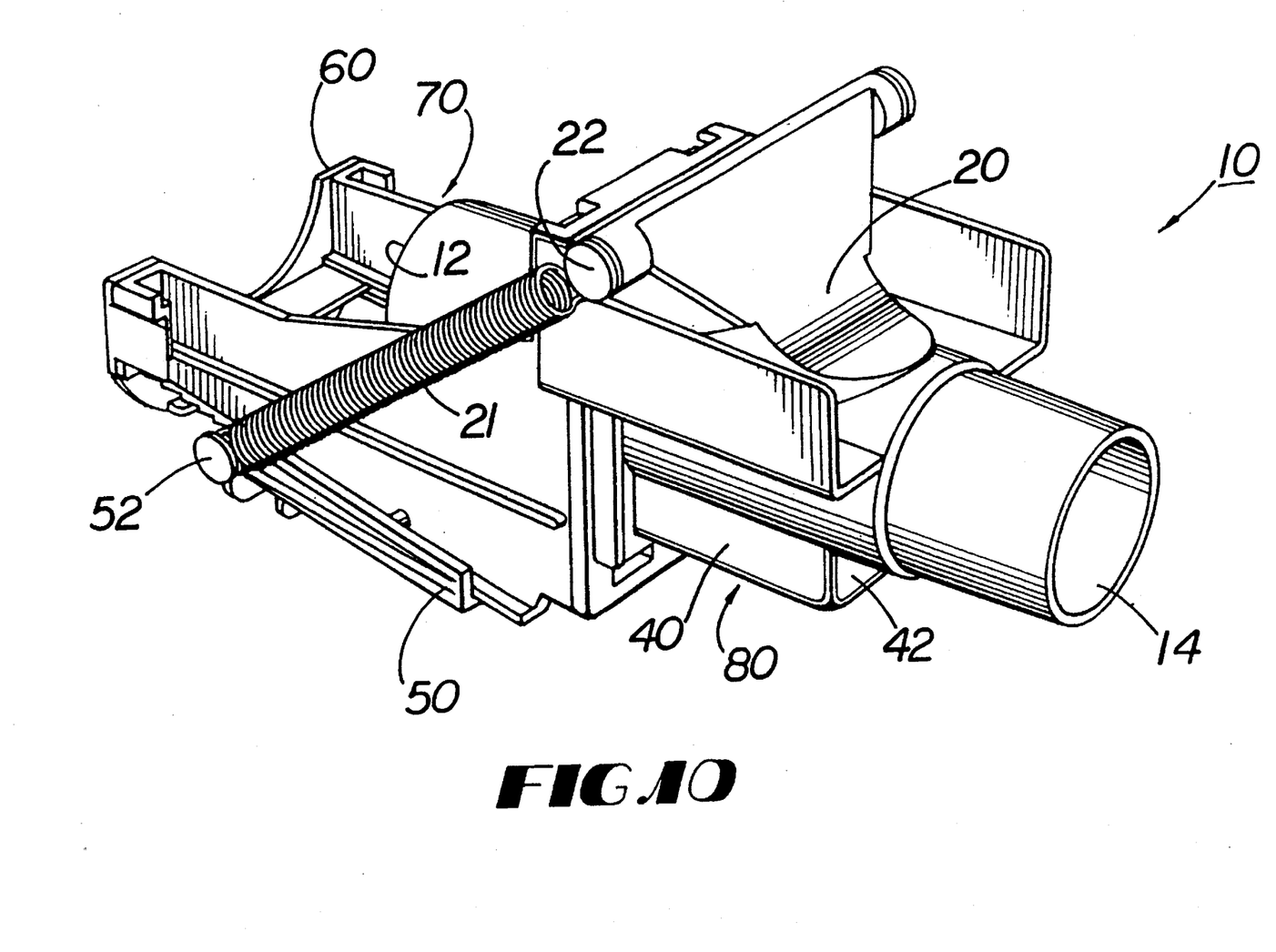
FIG. 10 is a perspective view of the assembled valve of the present invention equipped with a vortex inhibitor mechanism.

It has been found that the bypass inlet 16 of the valve 10 can ingest as much as 60-70 gpm of fluid while fluid flow from the cleaner is maintained at 14 gpm. Because of the high volumes of fluid ingested by the bypass inlet 16, it may be desirable to locate the valve 10 in the swimming pool or other body of fluid in which it is to operate so that the bypass inlet 16 faces away or is far from the surface of the fluid body. Otherwise, the volume of fluid flow may create a vortex that sucks air into the cleaning system. Alternatively, a vortex inhibitor, as shown in FIG. 10, can be provided in order to decrease the likelihood of vortex formation. The vortex inhibitor could be provided simply by attaching an L-shaped bracket about either side of the bypass inlet 16. The bracket can be formed by attaching a short rim to each ledge 33 located adjacent the bypass inlet 16. Together with the flap 20, the brackets leave only one side of the bypass inlet 16 open in order to allow water to flow through that area alone, thus inhibiting vortex formation by forcing the fluid flow to travel farther from the fluid surface before entering the bypass inlet. Despite the position of the valve 10 or the vortex inhibitor, skimming action may still be achieved by the variable flow 106 through the bypass inlet 16.

Construction of the body 30 of the valve 10 can be accomplished using a number of different methods. First, the valve 10 can be blow molded to form a complete and unitary device. Or, most of valve 10 could be blow molded, with certain features such as the sides 32 or vortex inhibitor later attached. FIGS. 8A–C and 9A–C show yet another method of forming valve 10 with a body 30 having a first section 70 and a second section 80.

Figures 8A, 8B:
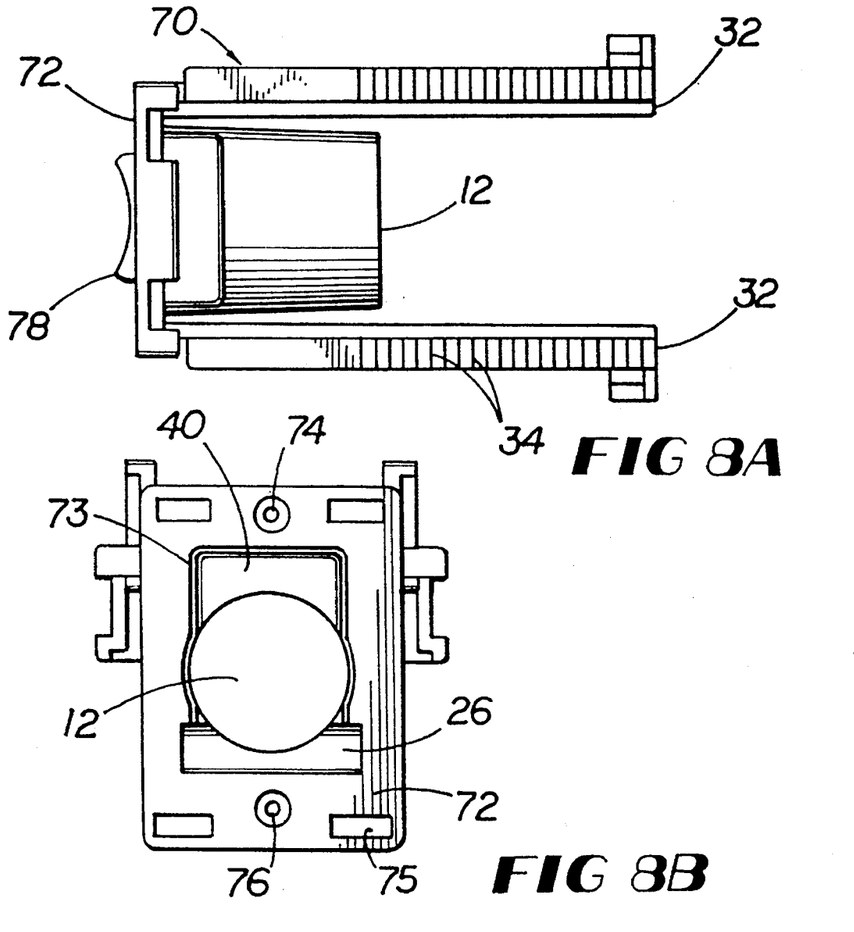
FIGS. 8A–B are top and front views, respectively, of the first section of the valve of the present invention.
Figure 8C:
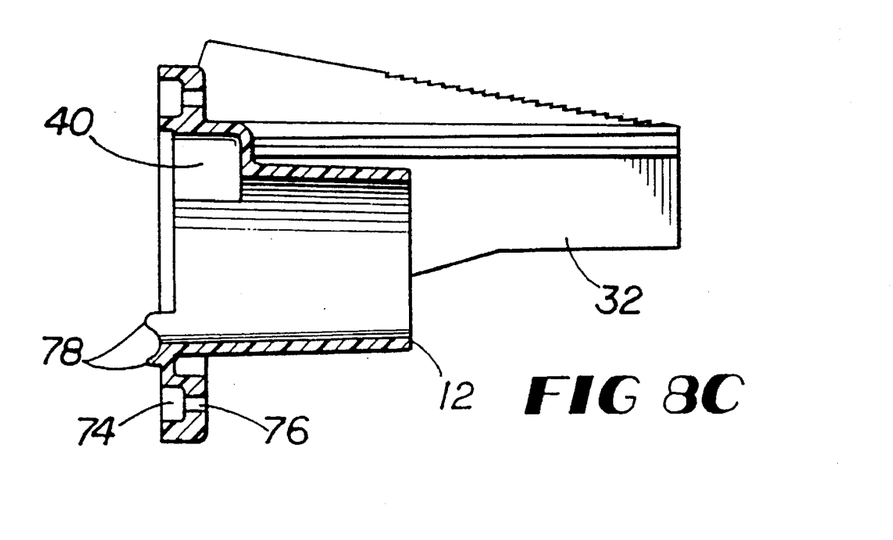
FIG. 8C is a cross-sectional side view along section lines A—A of the inlet section shown in FIG. 8A.

First section 70 forms a first mating face 72 to which is attached the inlet 12 and sides 32. First face 72 defines a groove 73 that surrounds the perimeter of the inlet 12 and cavity 40. Various features for attaching the first section 70 with the second section 80 also are formed upon the first face 72. Thus, the first face 72 defines several circular recesses 74 and engaging holes 75. Coaxial with the circular recesses 74 are pinholes 76. Also defined upon first face 72 are two ribs 78 that together help define a niche into which a corner of the bell crank-like structure forming the flap 20 will fit in order to rotate about the pivot point 26.

Figure 9A:
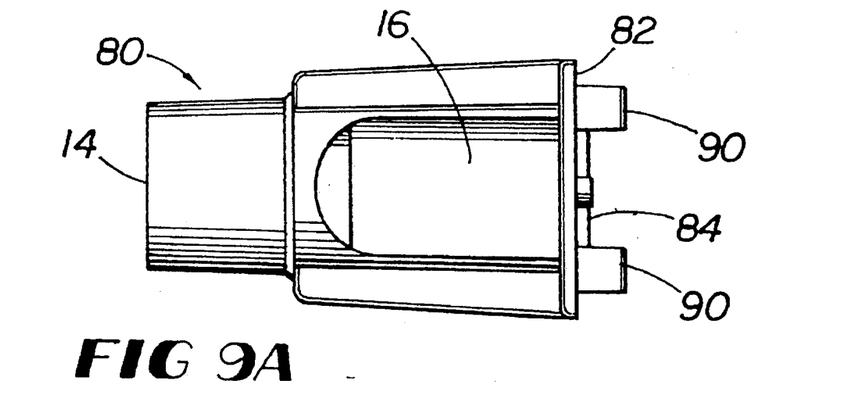
FIGS. 9A–C are top, front and side views of the second section of the valve of the present invention.
Figure 9B:
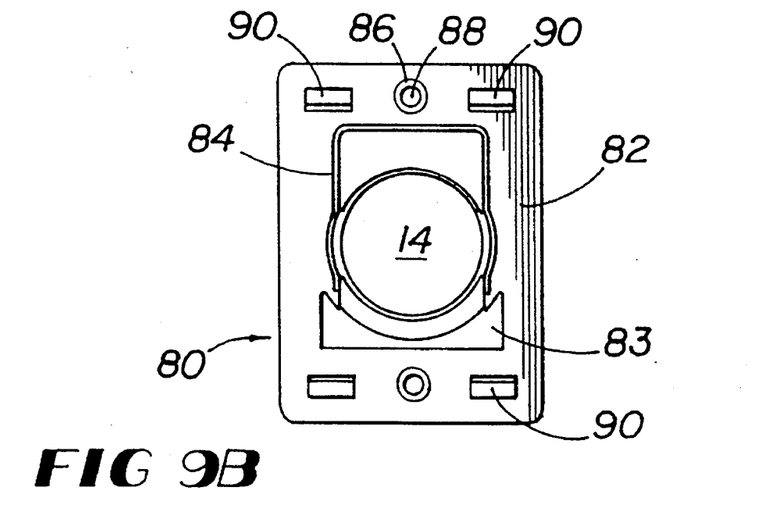
Figure 9C:
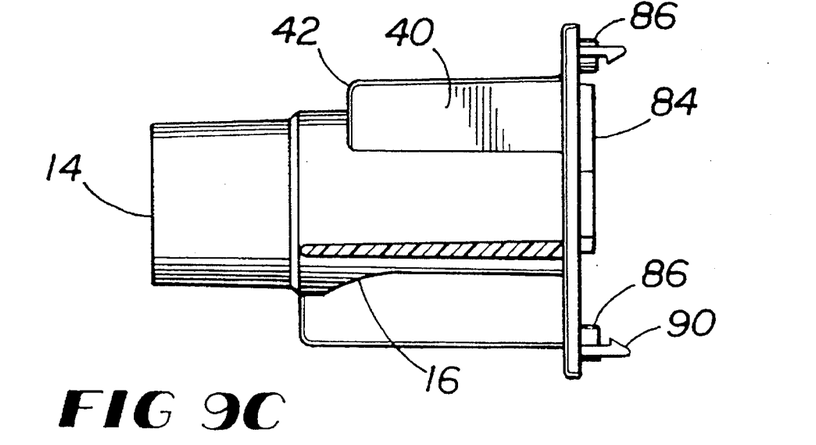

Second section 80 defines a second mating face 82 and the outlet 14. Bypass inlet 16 and most of the cavity 40 are formed in the second section 80. Cavity 40 could be located on the second section 80 if desired; or the cavity 40 could be located entirely within the first section 70, assuming a region of even lower pressure was desired. Situated roughly at each corner of the second face 82 are prongs 90. Second face 82 also has a rim 84 surrounding the cavity 40 and outlet 14. Rim 84 may be sized to seat within the groove 73 located on the first face 72. An opening 83 directly opposite the two ribs 78 may also be formed in the first face 72. Additionally, the second face 82 defines two circular posts 86 that fit tightly within the matching circular recesses 74. Coaxial with each post 86 are post pinholes 88. Also located roughly at each corner of the second face 82 are prongs 90 that define angled catches.

Once the first and second sections 70, 80 are formed, the valve 10 is assembled as shown in FIG. 10. Groove 73 of first section 70 accepts the rim 84 of second section 80; similarly, the recesses 74 accept the posts 86. By these attachment features alone, the first and second sections 70, 80 can be mated together to form a tight fit held by the friction between the first and second sections 70, 80. If desired, adhesive can be applied upon the first and second faces 72, 82 to maintain the fit of the first and second sections 70, 80. Furthermore, pins can be inserted into the coaxial pinholes 76, 88. The pins either can be used to interlock the two sections or adhesive can be applied on the pins for a more permanent bond. However, because the angled faces of the prongs 90 slide over the edges of the engaging holes 75 and then hook to those edges, adhesive is not required to join first and second sections 70, 80 into the body 30 of the valve 10. In fact, only mechanically coupling the first and second sections 20, 80 together may be desirable in order to allow the customer to disassemble the body 30 and clean the body 30 thoroughly. Assembly of the valve 10 can be completed by attaching the anchor 50 and end cap 60 to the sides 32. Then, the flap 20 is placed so that its corner passes through the opening 83 in the second face 82 and engages the ribs 78 located on the first face 72 that seat within the opening 83 to form the pivot point 26 and springs 21 are finally attached from the arm 22 to the knobs 52 on the anchor 50, as described.

The foregoing is provided for purposes of illustrating, explaining and describing one embodiment of the present invention. Modifications and adaptations to this embodiment will be apparent to those skilled in the art and may be made without departing from the scope or spirit of the invention and the following claims.

What is claimed is:

1. A flow control valve for compensating for fluctuations in the pressure within a selected cleaning system having a pump communicating with a swimming pool cleaner, the valve comprising:
   (a) a body comprising an inlet, an outlet and a bypass inlet;
   (b) a cover, defining a top surface, pivotally mounted above the bypass inlet and capable of moving from a closed position to an open position;
   (c) an arm attached to the cover; and
   (d) a spring defining a first end attached to the arm of the cover and a second end attached to an adjusting means in which the adjusting means moves the second end of the spring farther away from the first end to thereby increase the amount of closing force provided by the spring in order to conform with fluid flow parameters of the selected cleaning system so that the fluid flow through the inlet is substantially constant.

2. A valve according to claim 1 further comprising a vortex inhibitor having a wall that protrudes from the body next to the bypass inlet, that extends in a longitudinal direction that is parallel to the longitudinal axis of the body, and that is at least as long in the longitudinal direction as the bypass inlet.

3. A valve according to claim 1 in which:
   (a) the adjusting means further comprises an anchor to which the second end of the spring is attached;
   (b) the arm further comprises a spring attachment point to which the first end of the spring is attached;
   (c) a line from the pivot point to the spring attachment point defines a first axis;
   (d) the cover and arm pivot around a pivot point;
   (e) a line from the pivot point to the anchor define a second axis; and
   (f) the first axis and the second axis define an angle that is less than about fifty degrees when the cover completely occludes the bypass inlet and that is greater than zero degrees when the cover is in a fully open position such that the spring imparts a closing force on the arm for forcing the cover toward the closed position which increases at a decreasing rate as the cover moves from the closed position to the open position.

4. Apparatus capable of regulating the flow of fluid through a swimming pool cleaner communicating with a filtration system and pump, the apparatus comprising:
   (a) a first section comprising a first opening and at least one side extending from the first section;
   (b) a second section comprising a second opening and a bypass inlet;
   (c) means for joining the first section to the second section to form a body, such that a first fluid flow may pass through the first and second openings;
   (d) means, attached to the body, for substantially selectively occluding the bypass inlet;
   (e) a spring mounted in tension to impart a closing force upon the occluding means to force it toward a position that fully occludes the bypass inlet, which spring comprises a first end attached to the occluding means and a second end attached to the body such that the spring controls the occluding means to allow a bypass fluid flow to pass through the bypass inlet and to compensate for pressure variations within the cleaning system; and
   (f) means, attached to the second section and to the second end of the spring, for increasing the closing force imparted by the spring by moving the second end of the spring farther away from the first end in order to accommodate a desired range of pressure variations.

5. A valve according to claim 4 in which:
   (a) the means for increasing the closing force imparted by the spring further comprises a movable anchor to which the second end of the spring is attached;
   (b) the occluding means further comprises:
      (i) a cover that selectively occludes the bypass inlet,
      (ii) an arm to which the first end of the spring is attached at a spring attachment point, and
      (iii) a pivot point around which the cover and the arm rotate;
   (c) a line from the pivot point to the spring attachment point defines a first axis;
   (d) the pivot point and the anchor define a second axis; and (e) the first axis and the second axis define an angle that is less than about fifty degrees when the cover completely occludes the bypass inlet and that is greater than zero degrees when the cover is in a fully open position such that the spring imparts a closing force on the arm for forcing the cover toward the closed position which increases at a decreasing rate as the cover moves from the closed position to the open position.

6. A method of cleaning a swimming pool using an automatic swimming pool cleaner connected via means for carrying a fluid to a filter communicating with a pump to form a cleaning system operable within a desired fluid flow rate range, the method comprising the steps of:

(a) providing a flow control valve comprising a first end communicating with the automatic swimming pool cleaner, a second end communicating with the pump and a bypass inlet;

(b) drawing fluid through the cleaning system;

(c) covering the bypass inlet with a movable cover;

(d) continuously biasing the cover toward a closed position substantially to prevent the flow of fluid through the bypass inlet;

(e) moving the cover in response to fluid flow through the valve to at least a partially open position when the fluid flow within the valve increases beyond a threshold level so that resulting fluid forces within the valve together with ambient pressure exerted upon the cover propel the cover to an open position;

(f) adjusting the bias applied to the cover so that the valve operates within the desired fluid flow rate range; and (g) locating the valve with the bypass inlet facing away from the surface of the swimming pool in order to decrease the possibility of air entering the valve via a fluid vortex.

7. A method according to claim 6 further comprising the step of:

(h) locating the valve within the swimming pool so that the bypass inlet draws water from the surface of the pool into the valve in order to ingest debris located on the surface of the pool.

8. A method according to claim 7 in which the valve is located so as to minimize the possibility of ingesting air into the system.

9. A method according to claim 6 further comprising the step of increasing the compelling force when the cover begins to move toward an open position.

10. A method according to claim 6 in which the step of adjusting the bias occurs prior to the step of moving the cover.

11. A valve comprising:

(a) a first section comprising:

i. a generally tubular shaped inlet for accepting a relatively constant fluid flow;

ii. at least one support extending from the first section; and iii. an anchor movably attached to the support;

(b) a second section comprising:

i. a generally tubular shaped outlet through which fluid exits; and ii. a bypass inlet for accepting a variable bypass fluid flow;

(c) means, associated with the first and second sections, for detachably coupling the first section to the second section to form a body;

(d) a cover movably attached to the body and defining an arm;

(e) resilient means, attached to the arm and anchor, for continuously inclining the cover toward a closed position in which the bypass inlet is substantially occluded;

(f) a cavity, formed in the body, for creating a region of low pressure when fluid flows through the body and into the cavity, in which the force exerted by the area of low pressure, when the fluid flow exceeds a threshold level, combines with the force exerted upon the cover by an ambient environment in which the valve is located to cause movement of the cover from the closed position to an open position; and (g) means for moving the anchor along the support.

12. A valve according to claim 11 in which the anchor has a first series of ridges so that as it is moved to a new location on the support the first series of ridges engages a second series of ridges located on the support thereby to set the threshold level.

13. A valve according to claim 11 in which:

(a) the arm further comprises a spring attachment point to which the first end of the spring is attached;

(b) a line from the pivot point to the spring attachment point defines a first axis;

(c) the cover and arm pivot around a pivot point;

(d) a line from the pivot point to the anchor define a second axis; and (e) the first axis and the second axis define an angle that is less than about fifty degrees when the cover completely occludes the bypass inlet and that is greater than zero degrees when the cover is in a fully open position such that the spring imparts a closing force on the arm for forcing the cover toward the closed position which increases at a decreasing rate as the cover moves from the closed position to the open position.

* * * * *